No. 727,659.

Patented May 12, 1903.

UNITED STATES PATENT OFFICE.

FREDERICK WILLIAM MARTINO, OF SHEFFIELD, ENGLAND.

METHOD OF EXTRACTING NOBLE METALS.

SPECIFICATION forming part of Letters Patent No. 727,659, dated May 12, 1903.

Application filed September 30, 1901. Serial No. 77,139. (No specimens.)

*To all whom it may concern:*

Be it known that I, FREDERICK WILLIAM MARTINO, a subject of the King of England, residing in Sheffield, county of York, England, have invented a certain new and useful Improvement in the Process of Extracting the Noble Metals, (for which I have made application for Letters Patent in Great Britain, under No. 12,500, dated June 19, 1901,) of which the following is a specification.

Barium-sulfo-carbid is manufactured by fusing two parts, by weight, of barium sulfate (baryta or heavy spar) $BaSO_4$ in an electric furnace with one part of carbon. The carbon is preferably in the form of charcoal, coke, or anthracite. The furnace used is similar to those extensively employed in the preparation of calcium carbid. A current of about two hundred and fifty to three hundred amperes and about one hundred volts is sufficient.

Barium-sulfo-carbid when brought into contact with water gives off sulfureted hydrogen ($H_2S$) and for this reason is applicable, among other purposes, to the precipitation of metals, more particularly the noble metals, from various solutions—such as cyanid, chlorid, and bromid solutions containing them.

Gold may be recovered from its cyanid solution—*i. e.*, a solution of the double cyanid of gold and potassium—by the following process: The solution is acidified with hydrochloric acid, ammonium chlorid and formic acid being formed in the presence of air. Barium-sulfo-carbid is next added, sulfureted hydrogen being evolved and causing the gold to be precipitated as auric sulfid in cold solutions and aurous sulfid, if heated. It is preferred, however, to precipitate the gold as aurous sulfid by heating the solution before adding the barium-sulfo-carbid. The precipitation as aurous sulfid is more perfect, requires less barium-sulfo-carbid, (three parts of the latter being required for one part of auric as against one part for the same quantity of gold in the form of aurous sulfid,) and may be completed in a very much shorter period.

By this process the whole of the gold in the original cyanid solution may be recovered.

Gold may be recovered from its chlorid or bromid solutions and silver from its nitrate solution by either adding barium-sulfo-carbid to the solution or by first treating some barium-sulfo-carbid with water (preferably acidified) and then leading the gas evolved into the solution. In all cases it is preferred to deal with the reagent barium-sulfo-carbid in a powdered condition.

It is found that owing to the large percentage of sulfureted hydrogen evolved by the barium-sulfo-carbid a very small quantity of that compound is necessary for the precipitation of a given amount of gold. Should more than one metal be present in the solution and be precipitated by the addition of the barium-sulfo-carbid, as will often occur if the solution treated is the original double-cyanid solution obtained from the treatment of the ore, the various metals may be readily separated from the gold by any of the well-known methods, which, however, do not form part of the present invention.

What I claim, and desire to secure by Letters Patent, is—

1. The process of recovering the noble metals from solutions thereof, which consists in treating such solutions with barium-sulfo-carbid, substantially as described.

2. The process of recovering noble metals from cyanid solutions thereof, which consists in treating such solutions with barium-sulfo-carbid, substantially as described.

3. The process of recovering gold from its cyanid solution consisting in acidifying the solution and treating it at a raised temperature with barium-sulfo-carbid.

In testimony whereof I have signed my name to this specification in the presence of two subscribing witnesses.

FREDERICK WILLIAM MARTINO.

Witnesses:
GEORGE HENRY WELLS,
A. H. GREENWOOD.